US005558478A

United States Patent [19]

Odendahl et al.

[11] Patent Number: 5,558,478

[45] Date of Patent: Sep. 24, 1996

[54] DEVICE FOR TRANSFERRING A TORQUE TO A TOOL IN A HAND TOOL APPARATUS

[75] Inventors: Alfred Odendahl, Waldenbuch; Horst Sigg, Stuttart; Heinz Neubert, Ebersbach; Hans-Peter Meyen, Filderstadt, all of Germany

[73] Assignee: Robert Bosch GmbH, Stuttgart, Germany

[21] Appl. No.: 331,344

[22] Filed: Oct. 27, 1994

[30] Foreign Application Priority Data

Nov. 30, 1993 [DE] Germany .......................... 43 40 728.5

[51] Int. Cl.$^6$ .......................... B23B 51/02; B23B 31/107

[52] U.S. Cl. .......................... 408/226; 279/19.5; 279/82

[58] Field of Search .......................... 279/19, 19.3–19.5, 279/75, 82, 904, 905; 408/226

[56] References Cited

U.S. PATENT DOCUMENTS 4,502,824 3/1985 Dohse et al. .......................... 279/905
5,320,459 6/1994 Kleine .......................... 279/19.4

FOREIGN PATENT DOCUMENTS 272209 6/1988 European Pat. Off. .
2551125 4/1987 Germany .

*Primary Examiner*—Steven C. Bishop
*Attorney, Agent, or Firm*—Michael J. Striker

[57] ABSTRACT

The device for transferring torque to a tool member in a hand tool apparatus includes a plurality of catch grooves (23) and at least one elongated locking groove (25) spaced circumferentially from the catch grooves (23) provided in the tool shaft (11) of the tool member (12); a tool holder (10) having a tool receptacle (16) provided with a receptacle cavity (17) for the tool member (12) and having at least two axially extending catch elements (24) projecting inwardly into the receptacle cavity (17) so as to be engageable with the catch grooves (25) and at least one lock element (19) guided in a radial recess (18) provided in the tool receptacle (16) spaced circumferentially from the catch elements (24) so as to be radially movable outwardly against a spring force and engageable in the at least one locking groove (25) so as to limit axial motion of the tool member (12). To strengthen the torque transfer device for transferring torque to the tool member the at least one locking groove (25) in the tool shaft (11) includes a front portion (34) and a rear portion (33) and the front portion is deeper than the rear portion so that in a working position of the tool member (12) the at least one lock element (19) is located in the front portion of the at least one locking groove (25) and protrudes more deeply into the tool shaft (11) than in an idle position of the tool member (12) in which the at least one lock element (19) is located in the rear portion of the at least one locking groove (25).

16 Claims, 2 Drawing Sheets

FIG.8
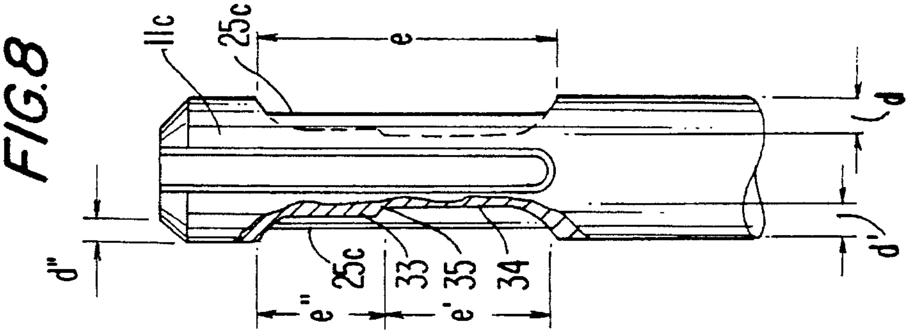
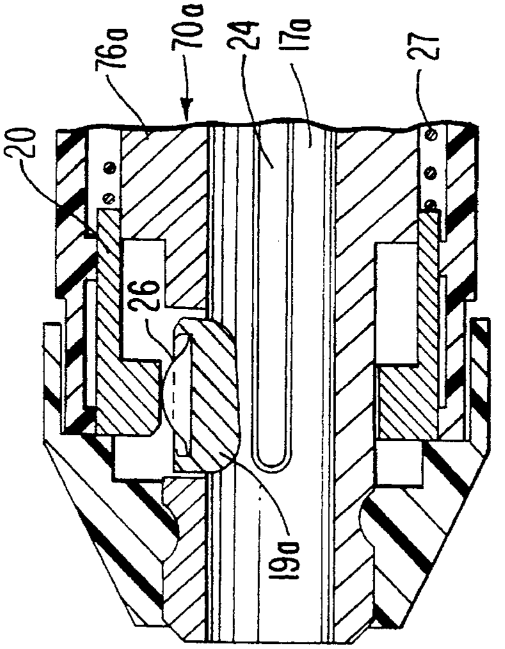
FIG.6
FIG.7
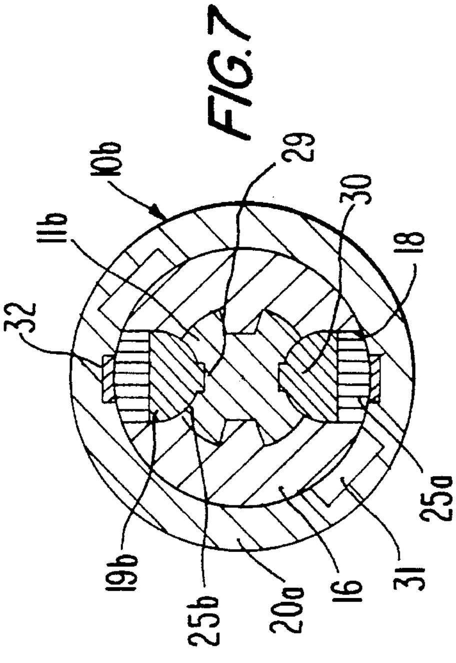

DEVICE FOR TRANSFERRING A TORQUE TO A TOOL IN A HAND TOOL APPARATUS

BACKGROUND OF THE INVENTION

The present invention relates to a mechanism or device for transferring a torque to a hammer drill tool and/or another tool of a hand tool apparatus and to a tool and tool holder that uses the device.

A device for transferring torque to a hammer drill tool and/or another tool of a hand tool apparatus is known and comprises a tool member having a tool shaft provided with a plurality of catch grooves in the tool shaft, open at the tool shaft end received in the tool apparatus and provided with at least one elongated locking groove circumferentially displaced from the catch grooves in the tool shaft; a tool holder having a tool receptacle provided with a receptacle cavity in which the drill tool is held in operation, wherein the tool receptacle has at least two axially extending, advantageously diametrically opposed, catch elements projecting inwardly into the receptacle cavity and engageable with respective catch grooves in the tool shaft and also having at least one lock element in a radial recess in the tool receptacle provided in a circumferential region of the receptacle cavity spaced from the catch elements and engageable in the at least one locking groove and the at least one locking groove is shaped to limit the axial motion of the tool when the at least one lock element is engaged in the at least one locking groove; and means for engaging and retaining the at least one lock element in the at least one locking groove.

One such device is described in German Open Patent Application DE-OS 25 51 125 in which two opposing catch elements are provided in the receptacle cavity of the tool holder, which engage in corresponding catch grooves provided in the tool shaft. Furthermore two similar opposing lock elements displaced 90° from the catch elements are provided, which lock radially into corresponding elongated locking grooves in the tool shaft and which guarantee that the axially slidable tool, e.g. a hammer drill bit or chisel bit, does not fall out and/or is not unintentionally pulled out of the tool holder.

Since this tool holding system known as "SDS-plus" is used for percussion drilling machines and hammer drill tools and for various tools of different power insertable in their tool holders, a single shaft diameter and also a single receptacle cavity diameter of about 10 mm, for example, are required for compatibility of the different tools. This has the disadvantage that the higher powered tools used in the correspondingly higher powered apparatus can be used for only a limited time in continuous operation under full load, because the torque transferring device becomes severely worn. The torque transmission occurs by engagement of only two comparatively small opposing side surfaces of the catch grooves and the inwardly projecting catch elements or catches—the so-called torque transferring device.

SUMMARY OF THE INVENTION

It is an object of the present invention to provide an improved device for transferring torque to a tool in a tool apparatus, especially for a percussion drilling machine, based on the so-called "SDS-plus" plug-in system for tool and tool driving apparatus in which the tool shaft diameters and the diameters of the receptacle cavity are predetermined, which avoids the above-described disadvantages and is compatible with different tools.

This object and others which will be made more apparent hereinafter are attained in a device for transferring a torque to a hammer drill tool and/or other tool comprising a tool member having a tool shaft provided with a plurality of catch grooves in the tool shaft, open at the tool shaft end received in the tool apparatus and with at least one elongated locking groove circumferentially spaced from the catch grooves in the tool shaft; a tool holder having a tool receptacle provided with a receptacle cavity in which the tool member is held in operation, wherein the tool receptacle has at least two axially extending, advantageously diametrically opposed, catch elements projecting radially inwardly into the receptacle cavity so as to be engageable with the respective catch grooves in the tool shaft and at least one lock element in a radial recess in the tool receptacle in a circumferential region of the receptacle cavity spaced circumferentially from the catch elements and engageable in the at least one locking groove and the at least one locking groove is shaped to limit the motion of the tool member when the at least one lock element is engaged in the locking groove; and means for engaging and retaining the at least one lock element in the at least one locking groove.

According to the invention, the at least one locking groove in the tool shaft includes a front portion and a rear portion closer to the tool shaft end held in the tool holder than the front section and the front section of the at least one locking groove extends deeper into the tool shaft than the rear section so that in a working position of the tool member the at least one lock element engaged in the at least one locking groove protrudes further into the tool shaft in the front section than in the rear section but engages in the less deep rear section in an idle position of the tool.

The device for transmitting torque according to the invention has the advantage that in higher powered machines and their tools the wear on the torque transferring device is reduced because of the deeper engagement of the lock element in the locking groove in the tool shaft in the operating position, since the lock element is in the deeper front section of the locking groove.

Another important part of the invention is the improved tool member having the tool shaft as described above in connection with the device for transferring torque according to the invention. This tool member can not only be used with the tool holder as described above but also in any machine with an "SDS-plus" tool receptacle which can use it without damage, i.e. with which it is compatible. It is also advantageous that the axial locking of the tool by the improved torque transferring device is not impaired and thus remains completely effective. Furthermore the longer axial engaging surfaces of the lock elements in the locking grooves of the tool shaft improve the tool member guidance in comparison to the currently used locking balls, which is particularly advantageous in lateral operation or levered action of the tool member.

In a preferred embodiment of the improved device for transferring torque to a tool member of a hand tool apparatus according to the invention the depth of the at least one locking groove increases linearly in an axial direction from a rear end to a front end of the tool shaft and a portion of the at least one lock element engaged in the at least one locking groove extends radially inward to an increasingly greater extent in the axial direction to the same extent that the depth of the at least one locking groove increases linearly in the axial direction. Advantageously the depth in the rear portion of the at least one locking groove increases in an axial direction from a rear end of the tool shaft to a front end of the tool shaft but remains constant in the front portion and the at least one lock element has rounded axial ends with constant width and height along the axial direction. In some embodiments the rear portion of the at least one locking groove has a depth which increases only over half its length in the forward axial direction. Axially extending side surfaces of the at least one locking groove and the at least one lock element are formed for engagement with each other to provide additional torque transfer to the tool member in preferred embodiments of the invention.

The catch elements advantageously include pairs of diametrically opposing catch elements.

An improved tool member is also the subject of this invention. The tool member has a tool shaft provided with a plurality of catch grooves and with at least one elongated locking groove spaced circumferentially from the catch grooves in the tool shaft, the catch grooves being open at a tool shaft end received in the hand tool apparatus. The at least one locking groove has a depth which increases in an axial direction from a rear end of the tool shaft held in the hand tool apparatus to a front end of the tool shaft and the at least one locking groove is provided with at least one axially extending side surface thereof as part of additional means for transferring torque to the tool member from the hand tool apparatus. Advantageously two axially extending planar side surfaces are provided on respective longitudinal sides thereof and extend parallel to each other. In preferred embodiments of the tool member the depth of the at least one locking groove increases in the axial direction until at a center of the at least one locking groove and from the center remains constant along the axial direction toward the front end. Also advantageously the at least one locking groove can have a flat front portion, a flat rear portion and a continuous smooth transition ramp portion between the front portion and the rear portion. The depth of the at least one locking groove in the front portion is different from a depth of the at least one locking groove in the rear portion.

An improved tool holder is also part of the invention. The tool holder has a tool receptacle provided with a receptacle cavity in which a tool member having a tool shaft is held in operation. The tool receptacle has at least two axially extending, advantageously diametrically opposed catch elements projecting inward into the receptacle cavity and engageable with catch grooves provided in the tool shaft and also having at least one lock element in a radial recess provided in the tool receptacle in a circumferential region of the receptacle cavity spaced circumferentially from the catch elements. The at least one lock element is engageable in at least one locking groove in the tool shaft and the at least one lock element is shaped to limit axial motion of the tool member when the at least one lock element is engaged in the at least one locking groove. The at least one lock element is guided in a locked position in the recess of the tool receptacle so as to be movable or to yield in a radially outward direction.

In preferred embodiments of the tool holder according to the invention the at least one lock element is longer in an axial direction from a rear end of the tool shaft to a front end of the tool shaft than wide in another direction transverse to the axial direction, and has longitudinal sides provided with parallel side surfaces connected by a curved radially directed inner side. A locking sleeve is advantageously located in an axial position adjacent to the at least one lock element in the tool holder and at least one spring element is arranged between each of the at least one lock elements and the locking sleeve so as to urge the at least one lock element radially inward. The at least one spring element is made from an elastic material which can be rubber, plastic or the like material.

Means for measuring a depth of insertion of the at least one locking element in the at least one locking groove of the tool member for control of an impact strength of the percussion drilling machine can be provided in the tool member. This means can include a sensor for the insertion depth of the at least one lock element which measures the pressure on the filling body.

BRIEF DESCRIPTION OF THE DRAWING

The objects, features and advantages of the present invention will now be illustrated in more detail by the following detailed description, reference being made to the accompanying drawing in which:

FIG. 6 is a cutaway longitudinal cross-sectional view of a tool holder holding the drill tool shaft shown in FIGS. 3 and 4;

FIG. 7 is a transverse cross-sectional view through another embodiment of a tool holder with an inserted tool shaft; and FIG. 8 is a cutaway side view of another embodiment of a tool member having a tool shaft provided with locking grooves each comprising a front and rear portion of different depths in a series of steps of increasing depth from the inserted rear end of the shaft to front end.

DESCRIPTION OF THE PREFERRED EMBODIMENTS

Figure 1:
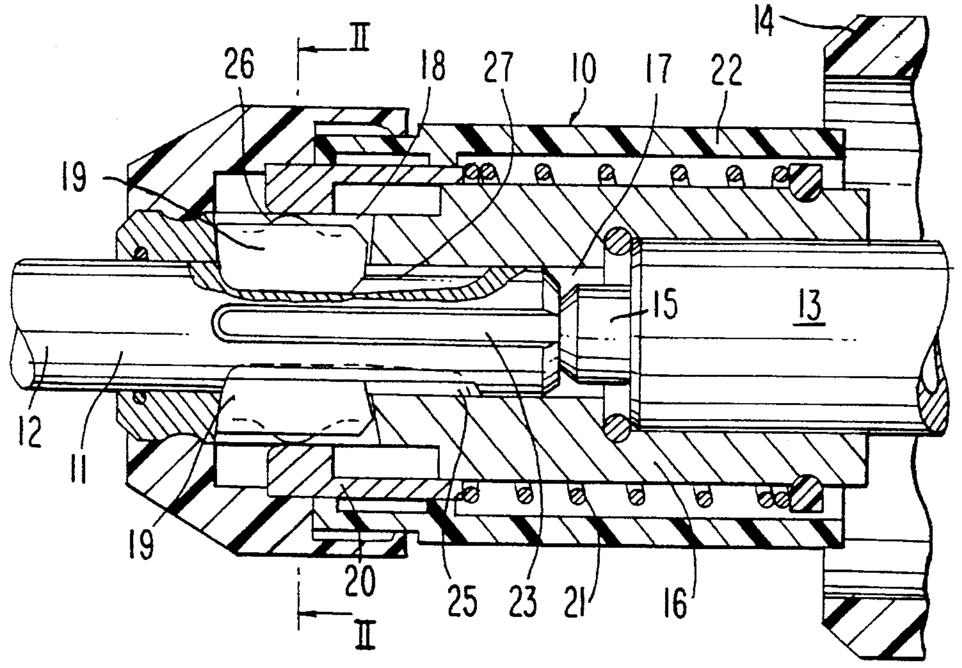
FIG. 1 is a detailed longitudinal cross-sectional view of a tool holder of a hammer drill with a drill tool held in the tool holder.

The device for transferring torque to a hammer drill tool and/or another tool in a hand tool apparatus, especially a percussion drilling machine and/or a drilling machine, comprises a tool holder 10 and an inserted tool shaft 11 of a tool member 12 used for drilling and/or driving or hammering which is held in the tool holder 10. In a first embodiment shown in FIGS. 1 and 2 the tool holder 10 is nonrotatably mounted on one end of a driven hollow cylindrical tool spindle 13 of a percussion drilling machine 14. An anvil 15 is axially slidable in the tool spindle 13 and in operation periodically strikes on the adjacent facing end of the tool shaft 11 by action of a impact producing mechanism in a known but unshown manner. The tool holder 10 comprises a pipe-like tool receptacle 16 provided with a receptacle cavity 17 for the tool shaft 11 and two lock elements 19 engaged in respective recesses 18 of the tool receptacle 16. A locking sleeve 20 is arranged concentrically over the lock elements 19 on the tool receptacle 16, which locks the lock elements 19 in their illustrated resting position by action of a compression spring 21. A slidable jacket 22 made of plastic material rigidly attached to the locking sleeve 20, which surrounds the locking sleeve 20 and the compression spring 21 concentrically, is slidable by hand axially to the rear against the force produced by the compression spring 21, whereby the lock elements 19 are released for radial motion so that they can move or yield radially outward during sliding of the work tool shaft 11 into and out of the tool holder 10 against a spring force.

The tool member 12 is provided with two opposing catch grooves 23 in the tool shaft 11 which are open at the shaft end inserted in the tool holder 10, in which two axially extending catch elements 24 (see Fig. 6) projecting inwardly into the receptacle cavity 17 engage respectively. The catch elements 24 are arranged circumferentially in the tool receptacle 16 spaced 90° from the lock elements 19. In a similar way two opposing axially extending locking grooves 25 are arranged on the outer circumference of the tool shaft 11 spaced 90° from the catch grooves 23 in the tool shaft 11. The locking grooves 25 however end before reaching the rear end of the tool shaft 11, i.e. the end inserted in the tool holder 10, so that the lock elements 19 engaged in them limit the axial motion of the tool member 12 in the tool receptacle 16. After sliding of the tool shaft 11 formed in this way into the tool receptacle 16 the slidable jacket 22 is again released and the compression spring 21 now presses the locking sleeve 20 with the slidable jacket 22 axially forward so that the lock elements engage radially in the locking grooves 25 and are locked by the locking sleeve 20 in this position so that they secure the tool member 12 against falling out of the tool holder 10.

To improve the torque transmission to the tool member 12 the axial shape of the locking grooves 25 is designed so that they are deeper in their forward region than in their rear region (by "rear region" is meant the portion of the groove closer to the rear end of the tool shaft inserted in the tool holder). Furthermore the lock elements 19 arranged in them are radially displaceable in the tool receptacle 16 in such a way that they engage in the front region of the locking grooves 25—and thus in the working position of the tool member 12—deeper in the locking grooves 25 then in the rear region, i.e. in the idle position. For this purpose, the lock elements 19 locked in their locking position by the locking sleeve 20 are guided so as to yield or move radially outwardly in the recesses 18, since a spring element 26, which pressures the lock element radially inwardly, is arranged between each lock element 19 and the locking sleeve 20. Because of that, it is guaranteed that in the working position of the tool member 12 by pressing the tool member 12 into a workpiece and/or a material to be worked, the tool shaft 11 is forced back into the tool receptacle 16 and then the lock elements 19 in tool shaft 11 move into the front portion or region of the locking grooves 25 which is deeper than in the idle position of tool member 12. In the idle position the tool member 12 is knocked forward by an idle impact of the anvil 15 and is partially forced out from the tool holder 10 until the lock elements 19 bear against the rear region or portion of the locking grooves 25 and the tool member 12 is secured from falling out of the tool receptacle 16.

When the tool member 12 is hurled forward because of the so-called idle impacts, considerable mechanical stresses occur particularly in heavy tools on the ends of the locking grooves 25 and on the rear ends of the locking elements 19 in the locking grooves 25, which can lead to an upward force and/or flattening of the tool shaft end with increasing depth of the locking grooves 25. The tool then becomes clamped in the tool receptacle 16 and thus becomes unusable. To avoid this the locking grooves 25 are flatter in their rear region used in the idle position, and are not as deep as in their forward region used in the working position. In the embodiment shown in FIG. 1 the depth d" of the locking grooves 25 only in the rear region increases over half of the axial length 1" of the rear region while the depth d" remains the constant over the length 1' of the front region.(See FIG. 8). Furthermore the lock elements 19 are longer than their width w and/or approximately half as long as the locking grooves 25. The lock elements 19 have a constant height h and thickness axially until at the rounded axial ends. FIG. 2 shows that the locking grooves 25 with increasing depth d have an axially extending planar side surface 27 on their longitudinal sides, which cooperates with a corresponding axially extending planar side surface 28 on the longitudinal side of the lock elements 19 to provide an additional torque transmission means. Because of that, these side surfaces and/or longitudinal sides provide additional torque transmission not only because of a deeper penetration radially in comparison to the currently used locking balls or rolls, but also because of the lengthening of the contacting shoulder so that the pressure on the torque transferring surfaces is reduced (and thus the wear as well).

Only one such side surface is required on the longitudinal sides of the locking grooves 25 and the lock elements 19 facing or leading in the direction of rotation of the tool shaft for additional transmission of the torque for turning or rotation. 0n the opposite longitudinal side in contrast then both in this and in the other embodiments, another shape or surface can be present, since the engagement of the lock elements in their locking grooves 25 would not be prevented by that. For example the planar side surfaces 27 and 28 of the longitudinal sides of the locking grooves 25 and lock elements 19 extend parallel to each other. FIG. 2 shows that in the embodiment of FIGS. 1 and 2 the lock elements 19 have a hump-shaped radially arched inner surface i extending in an axial direction, which is bounded by and connected to the side surfaces 28 which running parallel to each other on both longitudinal sides of the lock elements 19.

Figure 3:
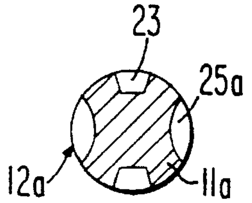
FIG. 3 is a transverse cross-sectional view of another embodiment of the invention showing the drill tool shaft taken along the section line III—III in FIG. 4.
Figure 4:
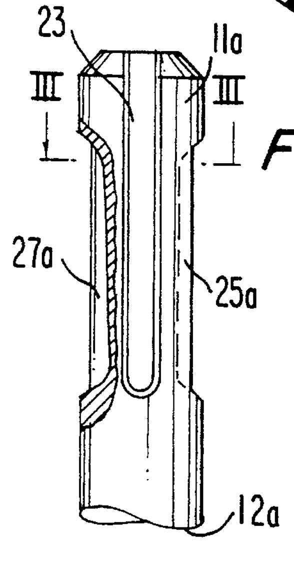
FIG. 4 is a cutaway side view of the inserted end of the drill tool shaft of the embodiment shown in FIG. 3 which is held in the tool holder showing the elongated locking grooves increasing in depth in an axial direction from inserted rear end to the front end of the drill tool shaft.
Figure 5:
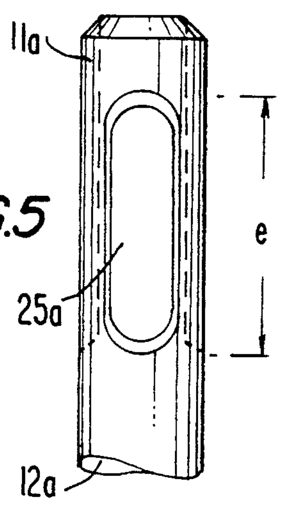
FIG. 5 is another cutaway side view of the inserted rear end of the drill tool shaft shown in FIG. 4 with the drill tool shaft rotated 90°.

FIGS. 3 to 6 show an additional embodiment of a hammer drill device according to the invention for torque transfer to a hammer drill tool. FIG. 3 shows a transverse section through a tool shaft **11*a* of a tool member 12*a* in the rear region or portion of the locking grooves 25*a*. The depth d of the locking grooves 25*a* in this embodiment increases linearly from the rear to the front end of the drill tool as can be seen from the cutaway portion of the tool shaft 11*a* in FIG. 4. The tool shaft 11*a* illustrated in FIG. 5 is seen rotated 90° from that of FIG. 4. FIG. 5 shows that the locking grooves 25*a* remain equally wide along their entire axial length 1 so that here also side surfaces 27*a* are provided for additional torque transmission with increasing depth of the locking grooves 25**.

Figure 2:
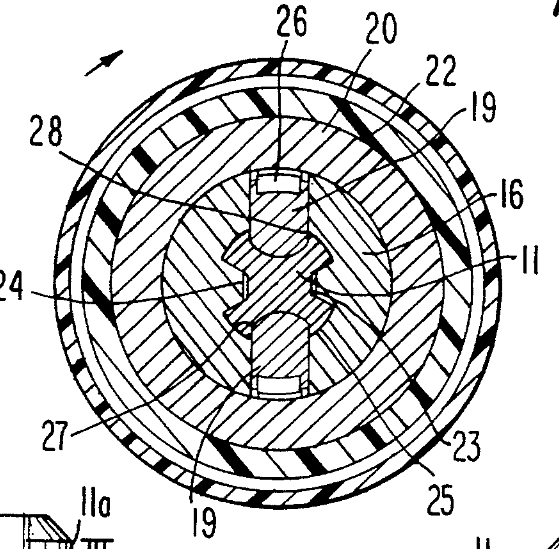
FIG. 2 is a transverse cross-sectional view through the tool holder taken along the section line II—II in FIG. 1.

In contrast to the embodiment of FIG. 1 only one lock element **19*a* is provided in the embodiment of the tool receptacle 16*a* shown in FIG. 6, which is sufficient for a less powerful tool apparatus and is more economical. The lock element 19*a* fitting in the locking grooves 25*a* here is formed and/or arranged in the tool receptacle 16*a* so that the portion of the lock element 19*a* engaged in the locking groove 25*a* protrudes inwardly to the same extent in the receptacle cavity 17*a* in an axial direction from the rear end to the front end of the tool shaft as the depth of the locking groove 25*a* increases. Also here the lock element 19*a* in the illustrated position locked by the locking sleeve 20 is guided so as to yield radially outwardly in the recess 18 by action of the spring element 26 so that the lock element 19*a* during a forward sliding of the tool shaft (in the increasing axial direction) is pressed radially outwardly from the base of the locking groove 25***a*, until it contacts finally in the end region of the locking groove 25 finally on the locking sleeve 20.

To keep the axial engaging surfaces 27 and 28 of the sides of the lock elements 19 and locking grooves 25 as long as possible for additional torque transmission while preventing an increase in the shaft length of the tool member 12, the catch elements 24 and lock elements 19 and/or 19*a* begin at the same height in the receptacle cavity 17 and/or 17*a* of the tool receptacle 16 and engage in the catch grooves 23 and the locking grooves 25 also at the same height or level on the tool shaft 11 and/or 11*a*. In this embodiment the lock elements 19 and/or 19*a* can be considerably longer than in the currently available tool receptacle, at least half as long as the locking grooves 25 and/or 25*a*.

A third example or embodiment of the device according to the invention is shown in FIG. 7, which shows a tool holder 10*b* with a tool shaft 11*b* of a tool member held in it. Additionally a longitudinal groove 29, in which a protruding element 30 on the interiorly directed surface of one of the lock elements 19*b* engages to provide additional torque transmission, is provided in each of the locking grooves 25*b*. As in the previous embodiments each of the lock elements 19*b* sits here in a radial recess 18 in the tool receptacle 16, which is gripped by a concentric locking sleeve 20*a*. A filling body 26*a*, which is made from an elastically deformable material, such as rubber, plastic or the like, is inserted in each of the recess 18 of the tool receptacle as a spring means between the lock element 19*a* and the locking sleeve 20*a*. Thus here also the lock elements 19*b* are retained radially elastically in their illustrated working position by the filling bodies 26*a*. The lock elements 19*b* thus contact with a definite pressure on the tool shaft 11*b* of the tool member inserted in the tool receptacle 16 by action of the compressed filling bodies 26*a*. The relative motion of the tool member is damped in the idle configuration by this spring action. The filling bodies 26*a* thus act simultaneously as damping bodies for the axial forward motion of the tool during the so-called idle strokes of the apparatus. In this embodiment to unlock or release the locking sleeve is rotated in the direction of the arrow, advantageously in the rotation direction of the tool member on the tool receptacle 16 until the respective filling bodies 26*a* reach appropriately wide and deep depressions 31 in the inner surface of the locking sleeve 20*a* at which positions they can yield or expand radially outward and thus release the lock elements 19*b*. In this position the tool shaft 11*b* can be pushed into or pulled out of the tool receptacle 16.

The radial engagement motion of the lock elements in the tool shaft can also be used to control the percussion performance of the hammer drill according to the tool type being used, since the locking grooves differ in depth according to the tool type. Thus either the insertion depth of the lock elements can be determined by a sensor or as in the example according to FIG. 7 the pressure of the spring means comprising the filling bodies 26*a* on the lock elements 19*b* can be measured by a sensor 32 for control of the impact strength of the hammer drill machine, which for example is mounted on the inner surface of the locking sleeve 20*a* in the illustrated working position according to FIG. 7. The sensor 32 controls the impact strength of the tool apparatus by means of unshown electronic circuit means. The embodiment with the filling bodies 26*a* is understandably provided alternatively with an axially slidable locking sleeve 20 with a corresponding axial arrangement of depressions 31.

In the embodiment shown in FIG. 4, the longitudinal axis of the locking grooves 25*a* is appropriately inclined relative to the rotation axis of the tool 12*a*, that is, the locking grooves 25*a* become continuously deeper in the forward axial direction (from the end of the shaft inserted in the tool holder to the free end of the tool). In one embodiment the locking grooves can be divided into different sections each having a different depth d', d", i.e. the distance of the bottom from the outer surface of the tool shaft 11 or 11*c*. In the embodiment shown in FIG. 8 the locking grooves 25*c* of the tool shaft 11*c* each comprise two different depth sections or steps. The rear flat section 33 is connected or continuously smoothly joined with a forward front section which has a greater depth d' by an inclined ramp portion 35. The working engagement of the tool member is coded or controlled by these steps or sections. If a drill or chisel bit is engaged in the tool holder, the lock elements 19 lock in the working position of the tool in the deeper front portion or section 34 and guarantee, because of that, an improved torque transmission to the tool member. At the same time the percussion performance of the tool apparatus may be adjusted according to the penetration depths of the lock elements as described above in regard to FIG. 7. The form of the ramp 35 at the step or section transition of the locking grooves 25*c* between the idle position and the working position guarantees a gentle transition in hammer drill operation. The ramp 35 can be curved as well as straight or in a linear form.

The invention is not limited to the illustrated embodiments. An improved torque transmission is provided by lock elements or bodies 19, 19*a*, 19*b* engaging deeper in the front section or portion 34 of the locking grooves 25, 25*a*, 25*b*, 25*c*. The side surfaces 27 and 28 of the lock elements and locking grooves can also be curved according to FIG. 7. Also the lock elements can be wedge shaped and extend radially.

While the invention has been illustrated and described as embodied in a device for torque transmission to a tool in a hand tool apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for transferring torque to a tool in a hand tool apparatus, said device comprising a tool member (12) having a tool shaft (11) provided with a plurality of catch grooves (23) and provided with at least one elongated locking groove (25) circumferentially displaced from the catch grooves (23) in the tool shaft (11), said catch grooves (23) being open at a tool shaft end received in the hand tool apparatus; a tool holder (10) having a tool receptacle (16) provided with a receptacle cavity (17) in which the tool member (12) is held in operation, wherein the tool receptacle (16) has at least two axially extending catch elements (24) projecting inwardly into the receptacle cavity (17) so as to be engageable with the catch grooves (25) in the tool shaft (11) and at least one lock element (19) in a radial recess (18) provided in the tool receptacle (16) in a circumferential region of the receptacle cavity (17) spaced circumferentially from the catch elements (24) so as to be movable radially outward against a spring force, said at least one lock element (19) being engageable in the at least one locking groove (25), the at least one locking groove (25) being shaped to limit axial motion of the tool member (12) when the at least one lock element (19) is engaged in the at least one locking groove (25); and means (20,26) for engaging and retaining the at least one lock element in the at least one locking groove (25), wherein the at least one locking groove (25) in the tool shaft (11) includes a front portion (34) and a rear portion (33), said rear portion (33) being closer to the tool shaft end held in the tool holder (10) than the front portion (34), and the front portion of the at least one locking groove (25) extends deeper into the tool shaft (11) than the rear portion of the at least one locking groove (25) so that in a working position of the tool member ( 12 ) the at least one lock element ( 19 ) engages in the front portion of the at least one locking groove (25) and extends deeper into the tool shaft (11) than in an idle position of the tool member (12) in which the at least one lock element (19) is located in the rear portion of the at least one locking groove (25).

2. Device as defined in claim 1, wherein the at least one locking groove (25) has a depth (d) increasing linearly in an axial direction from a rear end to a front end of the tool shaft (11) and a portion of the at least one lock element (19) engaged in the at least one locking groove (25) extends radially inward to an increasingly greater extent in said axial direction in the same amount as the depth (d) of the at least one locking groove increases linearly in said axial direction.

3. Device as defined in claim 1, wherein the at least one lock groove (25) has a depth (d") in the rear portion of the at least one locking groove increasing in an axial direction from a rear end of the tool shaft to a front end of the tool shaft but remaining constant in the front portion and the at least one lock element (19) has rounded axial ends and has a width (w) and a height (h) which both remain constant along said axial direction.

4. Device as defined in claim 3, wherein said rear portion has a length (l") in said axial direction and said depth (d") of said at least one locking groove (25) in said rear portion increases only over half of said length (l") in said axial direction.

5. Device as defined in claim 1, wherein the at least one locking groove (25) has a longitudinal side leading in a rotation direction of the tool member (25) and an at least approximately axially extending planar side surface (27) on said longitudinal side leading in said rotation direction and the at least one lock element (19) has a longitudinal side facing said rotation direction and a corresponding axially extending planar side surface (28) on said longitudinal side facing said rotation direction of the tool member (12) and said planar side surface (28) of said at least one lock element (19) engages and cooperates with said axially extending planar side surface (27) of said at least one locking groove (25) to provide additional means for transferring torque to the tool member (12).

6. Device as defined in claim 1, wherein said at least two catch elements (24) include a diametrically opposing pair of said catch elements (24) in said receptacle cavity.

7. Tool member (12) for a hand tool apparatus, said tool member (12) having a tool shaft (11) provided with a plurality of catch grooves (23) in the tool shaft (11) and provided with at least one elongated locking groove (25) spaced circumferentially from the catch grooves (23) in the tool shaft (11), said catch grooves (23) being open at a tool shaft end received in the hand tool apparatus, wherein the at least one locking groove (25) of the tool shaft (11) has a depth (d) increasing in an axial direction from a rear end of the tool shaft (11) held in the hand tool apparatus to a front end of the tool shaft (11) and said at least one locking groove (25) is provided with at least one axially extending side surface (27) thereof as part of additional means for transferring torque to the tool member from the hand tool apparatus.

8. Tool member (12) as defined in claim 7, wherein each of the at least one locking grooves (25) is provided with two of said axially extending planar side surfaces (27) on respective longitudinal sides thereof and extending parallel to each other.

9. Tool member (12) as defined in claim 7, wherein said depth of said at least one locking groove (25) increases in said axial direction until at a center of said at least one locking groove and from said center remains constant along said axial direction toward said front end.

10. Tool member (12) as defined in claim 7, wherein the at least one locking groove (**25*c*) has a flat front portion (34), a flat rear portion (33) and a continuous smooth transition ramp portion (35) between said front portion and said rear portion and wherein a depth (d') of the at least one locking groove (25*c*) in the front portion is different from a depth (d") of the at least one locking groove (25*c***) in the rear portion.

11. Tool holder (10) for a hand tool apparatus, said tool holder (10) having a tool receptacle (16) provided with a receptacle cavity (17) in which a tool member (12) having a tool shaft (11) is held in operation, wherein the tool receptacle (16) has at least two axially extending, catch elements (24) projecting inward into the receptacle cavity (17) so as to be engageable with catch grooves (23) provided in the tool shaft (11) and at least one lock element (19) guided in a radial recess (18) provided in the tool receptacle (16) in a circumferential region of the receptacle cavity (17) spaced circumferentially from the catch elements (24) so as to be movable radially outward against a spring force, wherein said at least one lock element (19) is engageable in at least one locking groove provided in the tool shaft (11), the at least one lock element (19) is shaped to limit axial motion of the tool member (12) when the at least one lock element (19) is engaged in the at least one locking groove and the at least one lock element (19) is provided with longitudinal sides having opposing axially extending planar side surfaces (28) in a region of the at least one lock element (19) protruding inwardly in the tool receptacle (16) and engaging on axially extending planar sides surfaces (27) provided in said locking grooves (25) to provide additional torque transmission to the tool member.

12. Tool holder (10) as defined in claim 11, wherein the at least one lock element (19) is longer in an axial direction from a rear end of the tool shaft to a front end of the tool shaft than wide in another direction transverse to the axial direction, and said opposing axially extending planar side surfaces (28) are parallel and connected to each other by a curved radially directed inner side.

13. Tool holder (10) as defined in claim 11, further comprising a locking sleeve (20) located in an axial position adjacent said at least one lock element (19) in said tool holder and at least one spring element (26) arranged between the at least one lock element (19) and the locking sleeve (20) so as to urge said at least one lock element (19) radially inward.

14. Tool holder (10) as defined in claim 11, wherein said at least one spring element (26) is made from an elastic material selected from the group consisting of rubber and plastic materials.

15. Tool holder (10) as defined in claim 11, wherein said hand tool apparatus is a percussion drilling machine and further comprising means for measuring a depth of insertion of said at least one lock element (19) in said at least one locking groove of said tool member (12) for control of an impact strength of said percussion drilling machine.

16. Tool holder (10) as defined in claim 15, wherein said means for measuring said depth of insertion of said at least one lock element (19) includes a depth sensor (32).

* * * * *